(12) United States Patent
    Grabbe

(10) Patent No.:   US 12,564,803 B2
(45) Date of Patent:     Mar. 3, 2026

(54) DISC FILTER HAVING A SUCTION DEVICE, AND METHOD FOR FILTERING FLUIDS USING A DISC FILTER

(71) Applicant: Mecana AG, Reichenburg (CH)

(72) Inventor: Ulrich Grabbe, Buttikon (CH)

(73) Assignee: Mecana AG, Reichenburg (CH)

( * ) Notice: Subject to any disclaimer, the term of this patent is extended or adjusted under 35 U.S.C. 154(b) by 399 days.

(21) Appl. No.: 18/028,023

(22) PCT Filed: Oct. 6, 2021

(86) PCT No.: PCT/EP2021/077496
§ 371 (c)(1),
(2) Date: Mar. 23, 2023

(87) PCT Pub. No.: WO2022/074030
PCT Pub. Date: Apr. 14, 2022

(65) Prior Publication Data
US 2023/0271118 A1     Aug. 31, 2023

(30) Foreign Application Priority Data
Oct. 6, 2020    (DE) ..................... 10 2020 126 133.0

(51) Int. Cl.
*B01D 33/50*      (2006.01)
*B01D 33/21*      (2006.01)
*B01D 37/00*      (2006.01)
(52) U.S. Cl.
CPC ........... *B01D 33/503* (2013.01); *B01D 33/21* (2013.01); *B01D 37/00* (2013.01); *B01D 2201/082* (2013.01)

(58) Field of Classification Search
CPC ...... B01D 33/503; B01D 33/21; B01D 37/00; B01D 2201/082
USPC ....... 210/780, 106–108, 258, 275, 314, 330, 210/333.01, 347, 391, 393, 408, 411, 413, 210/416.1, 425, 427
See application file for complete search history.

(56) References Cited

U.S. PATENT DOCUMENTS

| | | | | |
|---|---|---|---|---|
| 4,136,028 A | * | 1/1979 | Toivonen | ............... B01D 33/72 |
| | | | | 210/780 |
| 6,103,132 A | | 8/2000 | Seyfried et al. | |
| 2009/0026152 A1 | * | 1/2009 | Collins | .................. B01D 39/02 |
| | | | | 210/791 |

(Continued)

FOREIGN PATENT DOCUMENTS

| | | |
|---|---|---|
| AU | 2000-21355 B2 | 1/2002 |
| CA | 2023302 A1 | 2/1991 |
| CA | 2 813 927 A1 | 4/2012 |

(Continued)

OTHER PUBLICATIONS

English Translation of the International Preliminary Report on Patentability, mailed Apr. 6, 2023.

(Continued)

*Primary Examiner* — Madeline Gonzalez
(74) *Attorney, Agent, or Firm* — Collard & Roe, P.C.

(57)        ABSTRACT

A suction device for a disc filter includes at least one suction bar per discoid filter body and a suction slit designed for suctioning the impurities of the filter cloth, as well as a suction pump for suctioning the impurities. The suction bar is movable radially from the axis of rotation of the disc filter.

10 Claims, 1 Drawing Sheet

(56)     References Cited

U.S. PATENT DOCUMENTS

2017/0165597 A1*   6/2017   Kotler .................. B01D 33/503

FOREIGN PATENT DOCUMENTS

| | | |
|---|---|---|
| CN | 101301544 A | 11/2008 |
| DE | 198 11 255 A1 | 12/1998 |
| EP | 0 413 178 B1 | 3/1994 |
| EP | 0 958 028 B1 | 8/2001 |
| EP | 2 752 229 A1 | 7/2014 |
| JP | 6 158 581 B2 | 7/2017 |
| KR | 101398838 B1 | 5/2014 |
| KR | 101935746 B1 | 1/2019 |
| WO | 00/21638 A1 | 4/2000 |
| WO | 2008/103106 A1 | 8/2008 |
| WO | 2016/030903 A1 | 3/2016 |

OTHER PUBLICATIONS

International Search Report in PCT/EP2021/077496, mailed Jan. 12, 2022.

* cited by examiner

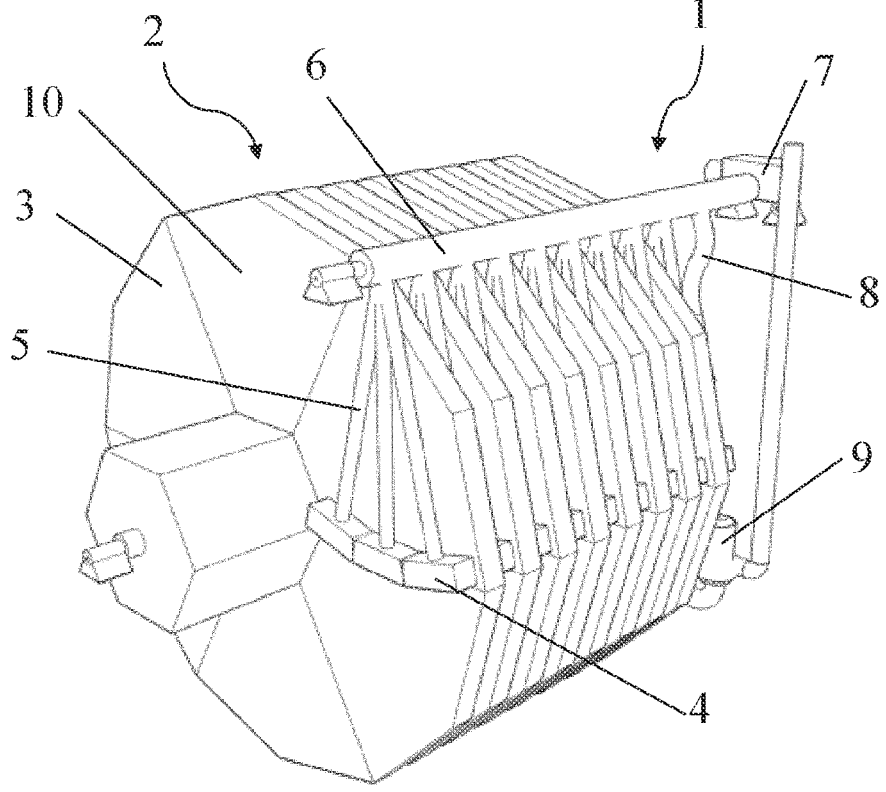

DISC FILTER HAVING A SUCTION DEVICE, AND METHOD FOR FILTERING FLUIDS USING A DISC FILTER

CROSS REFERENCE TO RELATED APPLICATIONS

This application is the National Stage of PCT/EP2021/077496 filed on Oct. 6, 2021, which claims priority under 35 U.S.C. § 119 of German Application No. 10 2020 126 133.0 filed on Oct. 6, 2020, the disclosure of which is incorporated by reference. The international application under PCT article 21(2) was not published in English.

The invention relates to a disc filter having a suction device, wherein the suction device comprises at least one suction bar per discoid filter body and a suction slit designed for suctioning the impurities of the filter cloth, as well as a suction pump for suctioning the impurities, wherein the suction bar is movable radially to the axis of rotation of the disc filter and the spacing of the suction bar from the filter cloth is adjustable.

Disc filters are used for example in wastewater treatment. Said filters consist of one or more discoid filter bodies which comprise a carrier frame that is covered with filter cloth. In this case, each discoid filter body can be composed of a plurality of sectors, which are each covered with a pouch-like filter cloth.

The simplest design of a filter cloth is a single-layer woven fabric which can hold back particles from water due to the sieving effect of the meshes. In general, filter cloths are formed so as to be multi-layered. Said filter cloths consist of a backing fabric having a relatively large mesh size, and an actively filtering layer. Said actively filtering layer comprises threads and filaments which are superimposed multiple times, in order to form flow channels which are curved multiple times and in which solid particles, which are smaller than the free cross section of the thread gaps, are held back mechanically or by absorption at the threads. An actively filtering layer of this kind, having a depth filter effect, is generally designed as needle felting or non-woven fabric.

The embodiment of the filter cloth as what is known as pile fabric, i.e. as a fleece, plush or velvet fabric, which consists of a relatively large-meshed backing fabric and pile, consisting of pile threads, worked in for example in W-weave, is more advantageous. In filtering operation, the pile threads lie on the inflow side of the filter cloth, and their length, stiffness and density are dimensioned such that the pile threads are transferred into a position approximately in parallel with the backing fabric, by the inflowing fluid and by the mechanical action of the suction lip during the cleaning process, and are thereby superimposed multiple times and form a depth filter, wherein a plurality of narrow, winding flow channels which are curved multiple times are formed between the superimposed pile threads, in which channels solid particles, the size of which is smaller than the clear width of the flow channels, can also be detained, in part mechanically and in part by absorption.

The flow resistance of the filter cloth is relatively high, and increases quickly as clogging of the flow channels increases. The filter cloth therefore has to be cleaned at relatively short intervals. This is generally carried out by backwashing, i.e. by conducting fluid, such as fresh water or filtrate, through the filter cloth, in the direction counter to the filter direction. The backwashing can be carried out simultaneously on the entire surface of the filter cloth, or only on a portion of the filter cloth, which is gradually moved over the surface thereof.

During backwashing of pile fabric, the pile threads are subjected to a fluid flow directed away from the backing fabric, and are thereby aligned relative to the backing fabric and are then positioned largely in parallel with one another and with the flow direction, as a result of which the volume of the pile layer increases significantly and the flow channels existing between the pile threads are opened and straightened. As a result, on the one hand the flow resistance for the backwashing fluid is reduced, such that said fluid can flow between the pile threads as high speed, and on the other hand the solid particles previously mechanically blocked in the flow channels are released, such that they can be detached and washed away by the backwashing fluid, overcoming the absorption forces.

Devices and methods for backwashing of filter cloths are known.

EP 2 752 229 A1 relates to a suction device for factory filters. The suction device comprises a suction plate having a main suction slit and a secondary suction slit which is delimited in a parallel manner by a partition wall. The pile threads are straightened in a delayed manner when passing through the secondary suction slit, and fluctuate, to then straighten quickly in the main suction slit. The backwashing effect is improved as a result.

WO 00/21638 describes a backwashing device for a drum filter. The backwashing device comprises a backwashing nozzle, which is arranged radially upstream of the filter media, in order to direct a flow of high-pressure fluid radially towards the inside, against the outer surface of the filter media, as a result of which sediments, which have accumulated on the radially inner surface thereof, are removed therefrom.

A cleaning device for filter cloth of a turntable filter or a drum filter is known from AU 200021355 B2. The cleaning device comprises at least one spray nozzle, which is suitable for spraying cleaning fluid onto a part of the filter cloth, in a direction counter to the filter direction. Furthermore, the apparatus comprises a drive device for generating a reciprocating movement of the spray nozzle. The drive device has a coupling, which converts the rotational movement of the drum into the reciprocating movement of the spray nozzle, in a ratio which is such that the rotational movement of the drum and the reciprocating movement of the nozzle are phase-shifted relative to one another.

AU 2008217733 B2 relates to a device for cleaning filter cloth of a turntable filter. The device comprises a rinsing ramp, on which at least one spray nozzle is arranged, wherein the spray nozzle is arranged such that it sprays a cleaning fluid onto the filter cloth in a direction counter to a filter direction, wherein the rinsing ramp comprises a drive device for moving the rinsing ramp along a longitudinal direction of the filter during the cleaning. Two spray nozzles, which are rotatable in a plane substantially perpendicular to the axis of rotation of the turntable filter, are arranged on the rinsing ramp. The nozzles are arranged on both sides of a discoid filter element, and are aligned to one another and to the filter cloth on one side of the discoid filter element.

CA 2813927 A1 describes a device for cleaning a filter cloth of a turntable filter. The device comprises a rinsing tube arranged between two adjacent parallel filter elements of the turntable filter. In this case, a plurality of spray nozzles are arranged in pairs around the rinsing tube, wherein their respective outlets are located at a spacing from the respective filter elements, which spacing is greater than half the spacing between two adjacent parallel filter elements.

US 2017/0165 597 A1 describes a device according to the preamble, which is used in particular for metal filters.

DE 198 11 255 A1 describes a method and a device for backwashing a filter disc, wherein a volume flow of a fluid cleaning agent is guided through the filter element to be cleaned, counter to the flow direction through the filter disc.

EP 0 413 178 B1 relates to a disc filter for mechanical cleaning of biologically treated wastewater, comprising filter discs which are arranged on a rotatably mounted, driveable supporting pipe and each comprise two suctionable filter surfaces. A suction device extends radially with respect to the supporting pipe.

EP 0 958 028 B1 discloses a method for filtering fluids using a filter cloth having a backing fabric and a pile, consisting of pile threads, on the side into which the fluid flows. The backwashing is achieved by a suction bar. During backwashing, the pile threads in the region of the suction slit are raised into a position protruding from the backing fabric, wherein the pile threads are subjected to a mechanical action by a surface of the suction bar facing said threads, before reaching the suction slit, by which mechanical action they are prevented from raising.

JP 6 158 581 B2 describes a filter device comprising discoid filter materials. A cleaning device for backwashing is provided between the filter elements.

KR 101398838 B1 describes a disc filter having a suction device, which comprises a suction bar having a suction slit that can be displaced with respect to the disc filter.

The object of the present invention is that of optimizing suction devices for disc filters.

The object is achieved, in a suction device, in that the filter cloth consists of a pile fabric and in that the width of the suction bar is smaller than the radius of the disc-shaped filter body, wherein the suction bar can be displaced from a position that corresponds to the smallest radius of the disc-shaped filter body to a position that corresponds to the largest radius of the disc-shaped filter body.

In this case, the width of the suction bar is smaller than the radius of the discoid filter body. Particularly preferably, the width of the suction bar corresponds to one third of the radius of the discoid filter body. The suction bar can be moved from a position which corresponds to the smallest radius of the discoid filter body, to a position which corresponds to the largest radius of the discoid filter body. In this way, the entire surface of the filter cloth of the discoid filter body can be taken off and backwashed via the suction bar. The movement of the suction bar can take place continuously from the position having the smallest radius to the position having the largest radius, and back. Alternatively, the movement of the suction bar can also take place in steps. For example, the suction bar can be moved one step in the radial direction at intervals or after each rotation of the disc filter. In this case, the suction bar can be immersed in water in each position, which allows for particularly effective backwashing.

Particularly advantageously, the radial movement of the suction bar allows for a narrower suction bar. On account of the narrower suction bar, the surface of the filter cloth suctioned by the suction bar in each case reduces, which increases the suction power. Compared with arrangements of a plurality of suction bars in series, radially from the axis of rotation of the disc filter, an advantage of the present suction device is that no additional valves are required for actuating the individual suction bars by means of the suction pump or a plurality of suction pumps. As a result, fault-prone mechanical parts can be avoided, which reduces the operating and maintenance costs of the suction device.

The embodiment of the filter cloth as pile fabric is particularly advantageous. In filtering operation, the pile threads form a depth filter having a plurality of narrow, winding flow channels which are curved multiple times, in which channels solid particles, the size of which is smaller than the clear width of the flow channels, can also be detained, in part mechanically and in part by absorption.

During backwashing, the flow channels are opened and straightened by means of the fluid flow directed away from the backing fabric. As a result, on the one hand the flow resistance for the backwashing fluid is reduced, such that said fluid can flow between the pile threads as high speed, and on the other hand the solid particles previously mechanically blocked in the flow channels are released, such that they can be detached and washed away by the backwashing fluid, overcoming the absorption forces. The smaller width of the suction bar, and the associated higher suction power, makes it possible to achieve a higher backwash speed at the same pumping capacity, as a result of which the cleaning effect of the backwashing is increased.

The adjustment of the spacing of the suction bar from the filter cloth makes it possible for the backwashing to be optimized, depending on the filter cloth to be cleaned and the fluid to be filtered. The filter cloth is pulled from the suction bar by the fluid stream, resulting in some amount of deflection of the filter cloth. In this case, the spacing of the suction bar from the filter cloth should be dimensioned such that the filter cloth remains in contact with the entire surface of the suction slit of the suction bar.

According to a preferred embodiment of the invention, a suction bar is provided in the gap between two discoid filter bodies in each case.

In this case, the suction bar comprises suction slits for suctioning the two filter cloths of the discoid filter bodies. Particularly advantageously, as a result, two filter cloths can be suctioned simultaneously using one suction bar.

One embodiment of the invention consists in the suction bar being linearly movable.

In this case, the suction bar is movable linearly in the direction radial to the axis of rotation of the disc filter. In this case, the suction bar is moved from the position having the smallest radius of the discoid filter body to the position having the largest radius of the discoid filter body, in order to suction the entire surface of the filter cloth of the discoid filter body.

A further embodiment of the invention consists in the suction bar being movable in a pendulum movement, by means of a suction arm.

In this case, the suction arm can be formed of a stiff material. The suction bar is located at an end of the suction arm and is moved from the position having the smallest radius of the discoid filter body to the position having the largest radius of the discoid filter body, by means of a pendulum movement. Advantageously, the suction arm is sufficiently long that the suction bar is located under the surface of the water at each point of the pendulum movement.

In this case, it is expedient for the suction device to comprise a manifold in the pivot point of the suction bar, which manifold is arranged in parallel with the axis of rotation of the disc filter.

The water for backwashing of the filter cloth is conducted away from the suction bar via the manifold. In this case, a plurality of suction bars can be connected to the manifold. In this case, the manifold can consist of a torsion-resistant material, such that the pendulum movement is transmitted, via the manifold and the suction arm, to the suction bar.

In this case, it is advantageous for the manifold to be connected to the suction pump via a flexible tube connection.

In this way, the manifold can be connected to the suction pump even in the event of a rotation of said manifold.

One embodiment of the invention consists in the suction bar being movable by means of a positioning drive that is decoupled from the rotary motor of the disc filter.

Advantageously, the decoupling of the positioning drive from the rotary motor of the disc filter prevents the suction bar from always being moved over the same path, over the filter cloth. The rotary drive, which is decoupled from rotary motor of the disc filter, advantageously allows for a flexible adjustment of the removal of the suction bar to the operating state of the disc filter. For example, the suction bar can be moved radially over the filter cloth continuously or in steps. Furthermore, the radial movement of the suction bar can be adjusted to the degree of contamination of the fluid to be cleaned by the disc filter.

In this case, a preferred embodiment of the invention consists in the positioning drive being operated hydraulically.

A further embodiment of the invention consists in the suction bar being movable into a position outside of the gap between the discoid filter bodies.

Advantageously, the suction bars can be more easily examined for damage, serviced, cleaned or replaced, on account of the movement outside of the gap between the discoid filter bodies.

Finally, the invention consists in a method for filtering fluids by means of a disc filter, in which the fluid to be filtered is conducted through a filter cloth, and in which the filter cloth is backwashed at intervals by means of a suction device according to any of the preceding claims.

The suction device according to the invention can both be used in new disc filters and subsequently fitted in the case of pre-existing disc filters.

An embodiment of the invention is described in greater detail in the following, with reference to a drawing, in which:

FIG. 1 is a perspective view of a suction device according to the invention, in the state when mounted on a disc filter.

FIG. 1 shows a suction device 1 according to the invention on a disc filter 2. The suction device 1 consists of a plurality of discoid filter bodies 3 which comprise a carrier frame that is covered with filter cloth 10. During operation, the disc filter 2 rotates about the axis of rotation thereof. In this case, the disc filter is immersed in a basin comprising fluid to be filtered. The fluid to be filtered passes through the filter cloth 10 from outside to inside, wherein solid bodies are filtered out of the fluid. The filtered water can be removed from the interior of the disc filter, for example by means of a pump.

The suction device consists of a suction bar 4 for backwashing the filter cloth 10. During backwashing, the filter cloth 10 is flushed by a fluid, such as fresh water or filtrate, in a direction counter to the filter direction. As a result, solid particles, which are detained in the filter cloth 10, can be released again.

The suction bar 4 is connected to a rigid suction arm 5. By means of the suction arm 5, the suction bar 4 can be moved in a pendulum movement and the fluid suctioned by the suction bar 4 can be conducted away. The suction bar 4 is moved radially with respect to the axis of rotation of the disc filter 2, by means of the pendulum movement. Three positions of the suction bar are shown by way of example in the figure. These are the position having the smallest radius of the discoid filter body 3, a middle position, and the position having the largest radius. In this case, the suction bar 4 can be moved continuously or in steps. Due to the pendulum movement of the suction bar 4, the entire surface of the filter cloth 10 of the discoid filter body 3 can be backwashed. The length of the suction arm 5 is designed such that the suction bar 4 is located below the fluid surface in every position of the pendulum movement.

In this case, with the exception of the two outermost suction bars 4, the suction bar 4 is attached in the gap between the discoid filter bodies 3. The suction bars 4 attached in the gap between the discoid filter bodies 3 comprise suction slits for backwashing the respective filter cloths 10 of the two discoid filter bodies 3.

The suction bars 4 are connected to the manifold 6 via the suction arm 5. The suctioned fluid is conducted away via the manifold 6. The manifold 6 is torsion-resistant, and is rotated by the positioning drive 7. Due to the rotation of the manifold 6, the suction bars 4 are moved in a pendulum movement by means of the suction arms 5. The manifold is connected to the suction pump 9 via a flexible tube connection 8.

The invention claimed is:

1. A disc filter having a suction device, wherein the suction device comprises at least one suction bar per discoid filter body and a suction slit designed for suctioning the impurities of a filter cloth by flushing the filter cloth in a direction counter to a filter direction with filtrate, as well as a suction pump for suctioning the filtrate and the impurities, wherein the suction bar is movable radially to an axis of rotation of the disc filter, wherein the suction bar is made of stiff material and the spacing of the suction bar from the filter cloth is adjustable to a selected dimension resulting in an amount of deflection of the filter cloth, wherein the filter cloth comprises a pile fabric and wherein the width of the suction bar is smaller than the radius of the discoid filter body, wherein the suction bar can be displaced from a position that corresponds to the smallest radius of the discoid filter body to a position that corresponds to the largest radius of the discoid filter body.

2. The disc filter according to claim 1, comprising:
   a plurality of suction bars, and
   a plurality of discoid filter bodies separated by a respective gap between the discoid filter bodies,
   wherein a respective suction bar is provided in each respective gap.

3. The disc filter according to claim 1, wherein the suction bar is linearly movable.

4. The disc filter according to claim 1, wherein the suction bar is movable in a pendulum movement by means of a suction arm.

5. The disc filter according to claim 4, wherein the suction device comprises a manifold in a pivot point of the suction bar, wherein the manifold is arranged in parallel with the axis of rotation of the disc filter.

6. The disc filter according to claim 5, wherein the manifold is connected to the suction pump via a flexible tube connection.

7. The disc filter according to claim 1, further comprising a rotary motor, wherein the suction bar is movable by means of a positioning drive which is decoupled from the rotary motor of the disc filter.

8. The disc filter according to claim 7, wherein the positioning drive is operated hydraulically.

9. The disc filter according to claim 2, wherein each respective suction bar is movable into a position outside of the respective gap between the discoid filter bodies.

10. A method for filtering fluids by means of the disc filter according to claim 1, the method comprising:

conducting the fluid to be filtered through the filter cloth, and backwashing the filter cloth by flushing the filter cloth in a direction counter to the filter direction with filtrate at intervals using the suction device.

\*   \*   \*   \*   \*